United States Patent [19]

McNicol

[11] Patent Number: 4,466,134

[45] Date of Patent: Aug. 14, 1984

[54] INTERMEDIATE FREQUENCY SLOPE COMPENSATION CONTROL ARRANGEMENTS

[75] Inventor: John D. McNicol, Nepean, Canada

[73] Assignee: Northern Telecom Limited, Montreal, Canada

[21] Appl. No.: 373,036

[22] Filed: Apr. 29, 1982

[51] Int. Cl.³ .......................... H04B 1/10; H03H 7/03
[52] U.S. Cl. ...................................... 455/311; 375/14; 333/18
[58] Field of Search ............... 455/234, 239, 240, 245, 455/246, 311; 375/12, 14, 15, 98, 100; 333/18

[56] References Cited

U.S. PATENT DOCUMENTS

| | | | |
|---|---|---|---|
| 3,646,448 | 2/1972 | Harmon, Jr. et al. | 375/98 |
| 3,838,350 | 9/1974 | Ewanus et al. | 375/98 |
| 3,879,664 | 4/1975 | Monsen | 375/98 |
| 4,261,056 | 4/1981 | Barnett et al. | 455/273 |
| 4,271,525 | 6/1981 | Watanabe | 375/100 |
| 4,283,693 | 8/1981 | Saenz | 455/239 |
| 4,306,306 | 12/1981 | Saenz | 375/14 |

Primary Examiner—Jin F. Ng
Attorney, Agent, or Firm—R. John Haley

[57] ABSTRACT

In a microwave digital radio transmission system receiver in which a modulated carrier wave is converted to an I.F. signal which is demodulated to produce phase quadrature signals, an apparent frequency error of the carrier wave is detected from the phase quadrature signals and used to control means, such as an I.F. amplitude equalizer, for compensating for amplitude slope of the I.F. signal. A control signal is produced by low pass filtering a product of one phase quadrature signal with the time differential of the other, or the difference between the products of each phase quadrature signal with the time differential of the respective other phase quadrature signal.

23 Claims, 3 Drawing Figures

INTERMEDIATE FREQUENCY SLOPE COMPENSATION CONTROL ARRANGEMENTS

This invention relates to intermediate frequency (I.F.) slope compensation control arrangements.

It is known to provide, in a receiver of a microwave digital radio transmission system, an I.F. slope amplitude equalizer in order to reduce the effects of frequency selective fading due to multiple propagation paths. In a known equalizer arrangement, amplitude slope across the I.F. pass band is controlled by detecting amplitudes at frequencies near the I.F. pass band edges and using any difference between such amplitudes to control the equalizer to reduce the difference. To this end, relatively narrow-band bandpass filters having center frequencies within the I.F. pass band are required, and these take up a considerable amount of space.

It is also known to provide in such a receiver a group delay slope equalizer for providing a fixed, non-adaptive, equalization of the group delay of the I.F. signal across the I.F. pass band.

An object of this invention is to provide an improved method of controlling means for compensating for slope of an I.F. signal, and an improved apparatus comprising such compensating means.

According to one aspect of this invention there is provided, in a system in which modulated carrier wave is converted to an intermediate frequency (I.F.) signal which is demodulated to produce differently-phased demodulated signals, the system including means for compensating for slope of the I.F. signal, a method of controlling the compensating means comprising deriving a control signal for the compensating means from said differently-phased demodulated signals.

Generally the differently-phased demodulated signals will comprise two phase quadrature signals, which are in any event produced in a system using quadrature amplitude modulation (QAM), quadrature partial response signalling (QPRS), or phase shift keying (PSK).

Preferably the compensating means compensates for amplitude slope of the I.F. signal and the control signal is derived from the phase quadrature signals by detecting an apparent frequency error of said carrier wave. Thus it is recognized that an I.F. amplitude slope manifests itself as an apparent frequency error of the carrier wave from which the I.F. signal is derived (although the actual frequency of the carrier wave is precisely determined), and that this apparent error can be conveniently detected from differently-phased demodulated (i.e. baseband) signals obtained by demodulation of the I.F. signal.

The control signal is preferably derived from a product of one of the phase quadrature signals with the time differential or a 90° phase-shifted version of the other, or from a difference between the products of each of the phase quadrature signals with the time differential or a 90° phase-shifted version of the respective other phase quadrature signal.

In an embodiment of the invention described below, the compensating means comprises an I.F. amplitude equalizer. However, the compensating means could instead comprise other means, such as means responsive to the control signal for varying the phase of a local oscillator signal which is used in deriving the I.F. signal from the carrier wave, as disclosed in Barnett et al. U.S. Pat. No. 4,261,056 issued Apr. 7, 1981.

According to another aspect this invention provides apparatus comprising: means for deriving an intermediate frequency (I.F.) signal from a modulated carrier wave; means responsive to a control signal for compensating for slope of the I.F. signal; means for demodulating the compensated I.F. signal to produce differently-phased demodulated signals; and control means responsive to said differently-phased demodulated signals for producing said control signal and applying it to said compensating means. As described above, the compensating means preferably comprises means, such as an I.F. amplitude equalizer, for compensating for amplitude slope of the I.F. signal, but other forms of compensating means may be used.

Preferably the control means comprise means for detecting an apparent frequency error of said carrier wave and for producing said control signal in dependence upon such detection.

Conveniently the demodulating means comprises means for producing two phase quadrature signals constituting said differently-phased demodulated signals.

In one embodiment of the invention the control means comprises means for phase shifting one of the phase quadrature signals by 90°, means for multiplying the phase-shifted phase quadrature signal by the other of the phase quadrature signals to produce a resultant signal, and means for deriving the control signal from said resultant signal. In another embodiment the control means comprises means for phase shifting each of the phase quadrature signals by 90°, means for multiplying each phase-shifted phase quadrature signal by the respective other of the phase quadrature signals to produce a respective product signal, means for forming the difference of the product signals to produce a resultant signal, and means for deriving the control signal from the resultant signal. The or each phase-shifted phase quadrature signal can be constituted by the time diffferential, for example formed by high-pass filtering, of the respective phase quadrature signal.

In a further embodiment of the invention the control means comprises means for producing two signals having a frequency substantially at the edge of the bandwidth of the phase quadrature signals and having a phase difference of 90°, means for multiplying each of two signals by a respective one of the phase quadrature signals to produce a respective product signal, means for low-pass-filtering each of the product signals, means for multiplying the low-pass-filtered product signals together to produce a resultant signal, and means for deriving the control signal from said resultant signal.

The apparatus may also include two bandpass filters via which the two phase quadrature signals are respectively coupled to the control means, the two bandpass filters having pass bands substantially at the edge of the bandwidth of the phase quadrature signals.

The means for deriving the control signal from the resultant signal conveniently comprises a low pass filter, having a cut-off frequency of for example 100 Hz, for extracting the d.c. component of the resultant signal for use as the control signal.

The invention will be further understood from the following description with reference to the accompanying drawings, in which.

Figure 1:
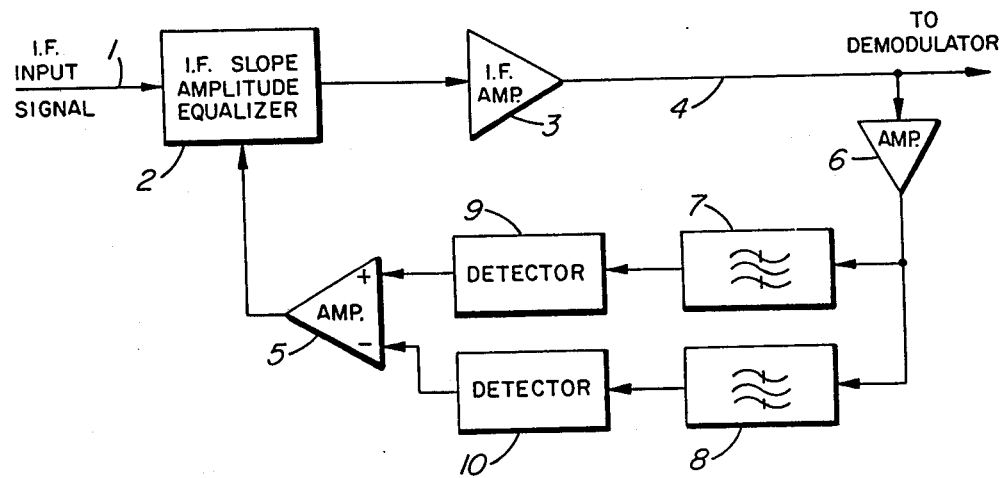
FIG. 1 illustrates a known form of I.F. amplitude slope equalization control arrangement.

Referring to FIG. 1, an intermediate frequency (I.F.) input signal on a wire 1 is coupled via an I.F. slope amplitude equalizer 2 and an I.F. amplifier 3 to a wire 4 which leads to a demodulator (not shown) for demodulation of the I.F. signal. The equalizer 2 is controlled by the output of a differential amplifier 5 to equalize the amplitude of input signals across the I.F. bandwidth, and may be of the type described in Saenz U.S. Pat. No. 4,306,306 issued Dec. 15, 1981 or may be of any other known type. For control of the equalizer 2, the I.F. signal on the wire 4 is coupled via a buffer amplifier 6 to the inputs of two bandpass filters 7 and 8, which have narrow pass bands near the upper and lower frequency limits of the I.F. passband. The outputs of the filters 7 and 8 are detected by detectors 9 and 10 respectively, whose outputs are coupled to the differential inputs of the amplifier 5. Amplitude slope of the I.F. input signal and hence of the signal on the wire 4 leads to a difference in the amplitudes of signals detected by the detectors 9 and 10, and hence to a control voltage being produced by the amplifier 5 to control the equalizer 2 to correct the slope.

For example, the arrangement of FIG. 1 may be used in a receiver of a 91.04 Mb/s 16 QAM (quadrature amplitude modulation) digital radio transmission system having an I.F. pass band from 58 to 82 MHz, the filters 7 and 8 each having a pass bandwidth of 4 MHz and having center frequencies of 60 and 80 MHz respectively.

A disadvantage of this known control arrangement is that the bandpass filters 7 and 8 take up a large amount of space.

Figure 2:
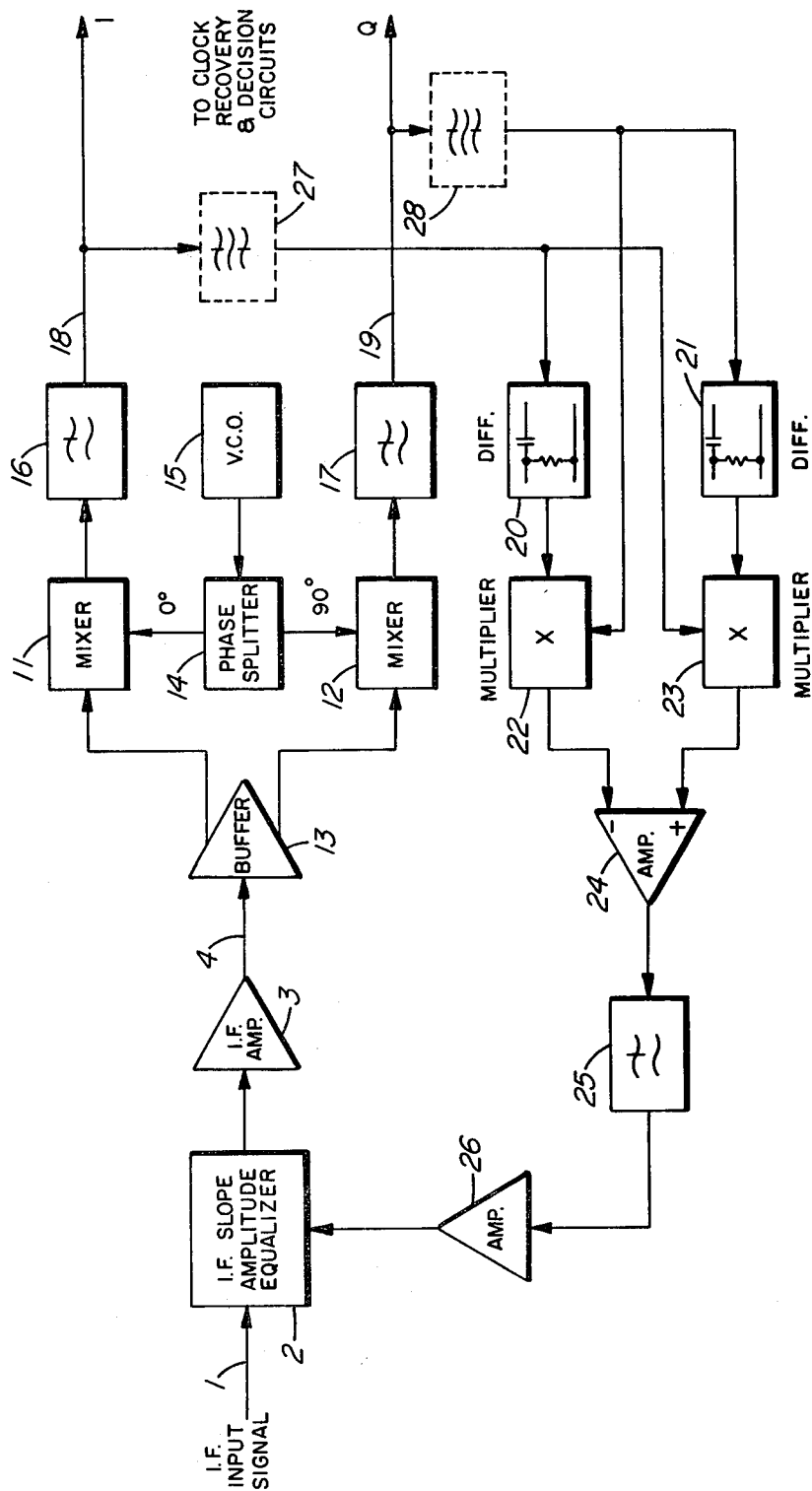
FIG. 2 illustrates an I.F. amplitude slope equalization control arrangement in accordance with an embodiment of the invention.

FIG. 2 illustrates the components 1 to 4 of FIG. 1, parts of a known form of demodulator for demodulating the I.F. signal on the wire 4 to produce baseband in-phase (I) and quadrature (Q) signals, and an I.F. amplitude slope equalization control arrangement according to an embodiment of the invention.

The demodulator comprises two mixers 11 and 12 which mix the I.F. signal derived from the wire 4 via a buffer amplifier 13 with phase quadrature components of a local oscillator signal derived from a phase splitter 14 and a voltage controlled oscillator (V.C.O.) 15, which is controlled in frequency in known manner by means not shown. The outputs of the mixers 11 and 12 are filtered by low pass filters 16 and 17 respectively to produce the I and Q signals on wires 18 and 19 respectively. The wires 18 and 19 are coupled to clock recovery and decision circuits (not shown) of known form, for recovering received data.

In the control arrangement of FIG. 2, the baseband signals I and Q are used to produce a control signal for the I.F. amplitude equalizer 2. To this end, the signals I and Q are applied to differentiators 20 and 21 respectively which produce time differential signals dI/dt and dQ/dt respectively which are applied to multipliers 22 and 23 respectively. The signals I and Q are also applied to the multipliers 23 and 22 respectively, which multipliers consequently produce the products I(dQ/dt) and Q(dI/dt) respectively at their outputs. A differential amplifier 24 has its inputs supplied with these products and produces at its output a signal which is proportional to the difference between the products. This signal is filtered by a low pass filter 25 and amplified by an amplifier 26 to produce the control signal for the equalizer 2.

For the system and frequencies discussed above, for which the transmitted symbol rate is 22.76 MSymbols/s, the low pass filters 16 and 17 can have cut-off frequencies of 11.38 MHz, and the low pass filter 25 can have a cut-offff frequency of 100 Hz. As illustrated in FIG. 2, each of the differentiators 20 and 21 can be constituted by a simple high pass filter, comprising a series capacitor and a shunt resistor, having a cut-off frequency above half the symbol rate, i.e. above 11.38 MHz in this case. For example, the differentiators 20 and 21 could each be constituted by a high pass filter having a cut-off frequency of 22.76 MHz, corresponding to the symbol rate.

Instead of providing the amplifier 24 and the two multipliers 22, 23 and differentiators 20, 21, the arrangement of FIG. 2 may be simplified by providing only one differentiator and one multiplier to form the product I(dQ/dt) or the product Q(dI/dt), this being low pass filtered and amplified to produce the control signal for the equalizer 2. Such a simplified circuit, together with the demodulator, is similar to a so-called quadricorrelator frequency-difference detector which is known in itself for use in phase locked loops for frequency control of an oscillator. It follows that other forms of frequency-difference detector may be used in accordance with this invention to control the equalizer 2. This is consistent with the understanding that the I.F. amplitude slope which is equalized by the equalizer 2 manifests itself as an apparent frequency error in the modulated carrier from which the I.F. input signal is derived.

It should be appreciated that the differentiators 20 and 21 described above each constitute a particular form of 90° phase shifter for the respective phase quadrature signal I or Q. Accordingly, each differentiator may be replaced by any other suitable form of 90° phase shifter.

Figure 3:
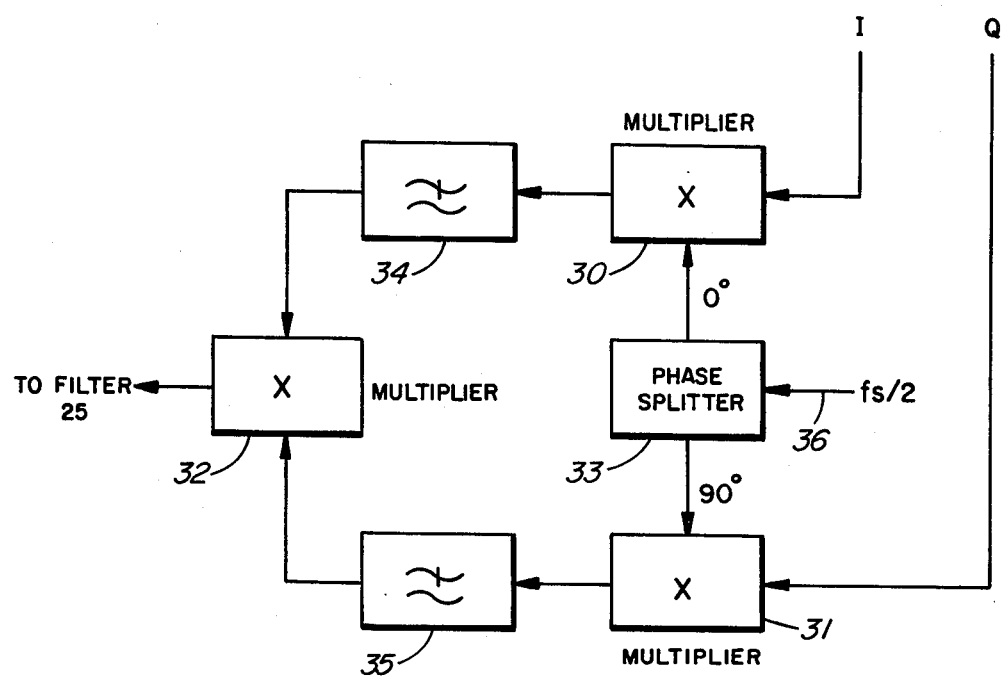
FIG. 3 illustrates an alternative form of control arrangement in accordance with the invention.

FIG. 3 illustrates an alternative form of control arrangement which can be used to replace the components 20 to 24 in FIG. 2. The control arrangement of FIG. 3 comprises three multipliers 30, 31, and 32, a phase splitter 33, and two low pass filters 34 and 35.

The demodulated phase quadrature signals I and Q are multiplied in the multipliers 30 and 31 respectively by signals which have a frequency fs/2 and which have a phase difference of 90°. These signals are produced by the phase splitter 33 from a signal at the frequency fs/2 supplied thereto via a wire 36. The frequency fs is the transmitted symbol rate, for example 22.76 MSymbols/s as described above, so that the frequency fs/2 is half the symbol rate (11.38 MHz) and is substantially at the edge of the bandwidth of the phase quadrature signals I and Q. The signal on the wire 36 is readily derived in known manner from the clock recovery and decision circuits already referred to.

Relatively low frequency components of the product signals produced by the multipliers 30 and 31 are produced by the low pass filters 34 and 35, which for example each have a cut-off frequency of 500 kHz, and are multiplied together by the multiplier 32 to produce a resultant signal which is applied to the low pass filter 25 in FIG. 2.

The arrangements of FIGS. 2 and 3 can be modified by deriving the I and Q signals via bandpass filters 27 and 28 respectively, as shown in broken lines in FIG. 2. The bandpass filters 27 and 28 each have for example a bandwidth of 1 MHz and a center frequency of 11.38 MHz, these filters thus having pass bands substantially at the edge of the bandwidth of the I and Q signals.

Instead of the I.F. amplitude equalizer 2, any other suitable means may be provided for compensating for amplitude slope of the I.F. signal in response to the control signal. In particular, the equalizer 2 may be replaced by compensating means of the type disclosed in U.S. Pat. No. 4,261,056 already referred to, in which phase shifting of a local oscillator signal relative to the carrier wave is effected in response to a control signal to compensate for amplitude slope of the I.F. signal. The control arrangement of this invention can be used to replace a control arrangement of the type shown in FIG. 7 of that patent.

Although particular embodiments of the invention have been described in detail, numerous variations, modifications, and adaptations may be made without departing from the scope of the invention, which is defined in the claims.

What is claimed is:

1. A method of controlling the slope of an intermediate frequency signal comprising the steps of: converting a modulated carrier wave to an intermediate frequency (I.F.) signal, demodulating said intermediate frequency signal to produce differently-phased demodulated signals, recovering data from the differently-phased demodulated signals, compensating for slope of the I.F. signal, in response to a control signal, and controlling the compensating step by deriving said control signal from said differently phased demodulated signals prior to the data recovering step.

2. A method as claimed in claim 1 wherein said differently-phased demodulated signals comprise two phase quadrature signals.

3. A method as claimed in claim 2 wherein the compensating step compensates for amplitude slope of the I.F. signal.

4. A method as claimed in claim 3 wherein said control signal is derived from a product of one of said phase quadrature signals with the other of said phase quadrature signals phase shifted by 90°.

5. A method as claimed in claim 3 wherein said control signal is derived from a difference between the products of each of said phase quadrature signals with the respective other of said phase quadrature signals phase shifted by 90°.

6. A method as claimed in claim 5 wherein each phase-shifted phase quadrature signal is produced by forming a time differential of the respective phase quadrature signal.

7. A method as claimed in claim 3 wherein said control signal is derived from a product of low-pass-filtered products of each of the phase quadrature signals with a respective one of two signals having a frequency substantially at the edge of the bandwidth of the phase quadrature signals and having a phase difference of 90°.

8. A method as claimed in claim 4 wherein the phase-shifted phase quadrature signal is produced by forming a time differential of said other of said phase quadrature signals.

9. A method as claimed in claim 2, 3, or 7 and comprising filtering the phase quadrature signals in bandpass filters having pass bands substantially at the edge of the bandwidth of the phase quadrature signals, the control signal being derived from the filtered phase quadrature signals.

10. Apparatus comprising:
means for deriving an intermediate frequency (I.F.) signal from a modulated carrier wave;
means responsive to a control signal for compensating for slope of the I.F. signal;
means for demodulating the compensated I.F. signal to produce differently-phased demodulated signals;
means for recovering data from the differently-phased demodulated signals; and
control means responsive to said differently-phased demodulated signals prior to the data recovery means, for producing said control signal and applying it to said compensating means.

11. Apparatus as claimed in claim 10 wherein the compensating means comprises means for compensating for amplitude slope of the I.F. signal.

12. Apparatus as claimed in claim 11 wherein the compensating means comprises an I.F. amplitude equalizer.

13. Apparatus as claimed in claim 11 or 12 wherein said control means comprises means for detecting an apparent frequency error of said carrier wave and for producing said control signal in dependence upon such detection.

14. Apparatus as claimed in claim 11 wherein the demodulating means comprises means for producing two phase quadrature signal constituting said differently-phased demodulated signals.

15. Apparatus as claimed in claim 14 wherein the control means comprises means for phase shifting one of the phase quadrature signals by 90°, means for multiplying the phase-shifted phase quadrature signal by the other of the phase quadrature signals to produce a resultant signal, and means for deriving the control signal from said resultant signal.

16. Apparatus as claimed in claim 14 wherein the control means comprises means for phase shifting each of the phase quadrature signals by 90°, means for multiplying each phase-shifted phase quadrature signal by the respective other of the phase quadrature signal to produce a respective product signal, means for forming the difference of the product signals to produce a resultant signal, and means for deriving the control signal from said resultant signal.

17. Apparatus as claimed in claim 16 wherein the means for phase shifting each phase quadrature signal by 90° comprises means for forming the time differential of the respective phase quadrature signal.

18. Apparatus as claimed in claim 16 wherein the means for phase shifting each phase quadrature signal by 90° comprises a high pass filter.

19. Apparatus as claimed in claim 14 wherein the control means comprises means for producing two signals having a frequency substantially at the edge of the bandwidth of the phase quadrature signals and having a phase difference of 90°, means for multiplying each of said two signals by a respective one of the phase quadrature signals to produce a respective product signal, means for low-pass-filtering each of the product signals, means for multiplying the low-pass-filtered product signals together to produce a resultant signal, and means for deriving the control signal from said resultant signal.

20. Apparatus as claimed in claim 15, 16, or 19 and including two bandpass filters via which the two phase quadrature signals are respectively coupled to the control means, the two bandpass filters having pass bonds substantially at the edge of the bandwidth of the phase quadrature signals.

21. Apparatus as claimed in claim 15, 16, or 19 wherein the means for deriving the control signal from said resultant signal comprises a low pass filter.

22. Apparatus as claimed in claim 15 wherein the means for phase shifting said one of the phase quadrature signals by 90° comprises means for forming the time differential of said one of the phase quadrature signals.

23. Apparatus as claimed in claim 15 wherein the means for phase shifting said one of the phase quadrature signals comprises a high pass filter.

* * * * *